Patented June 21, 1938

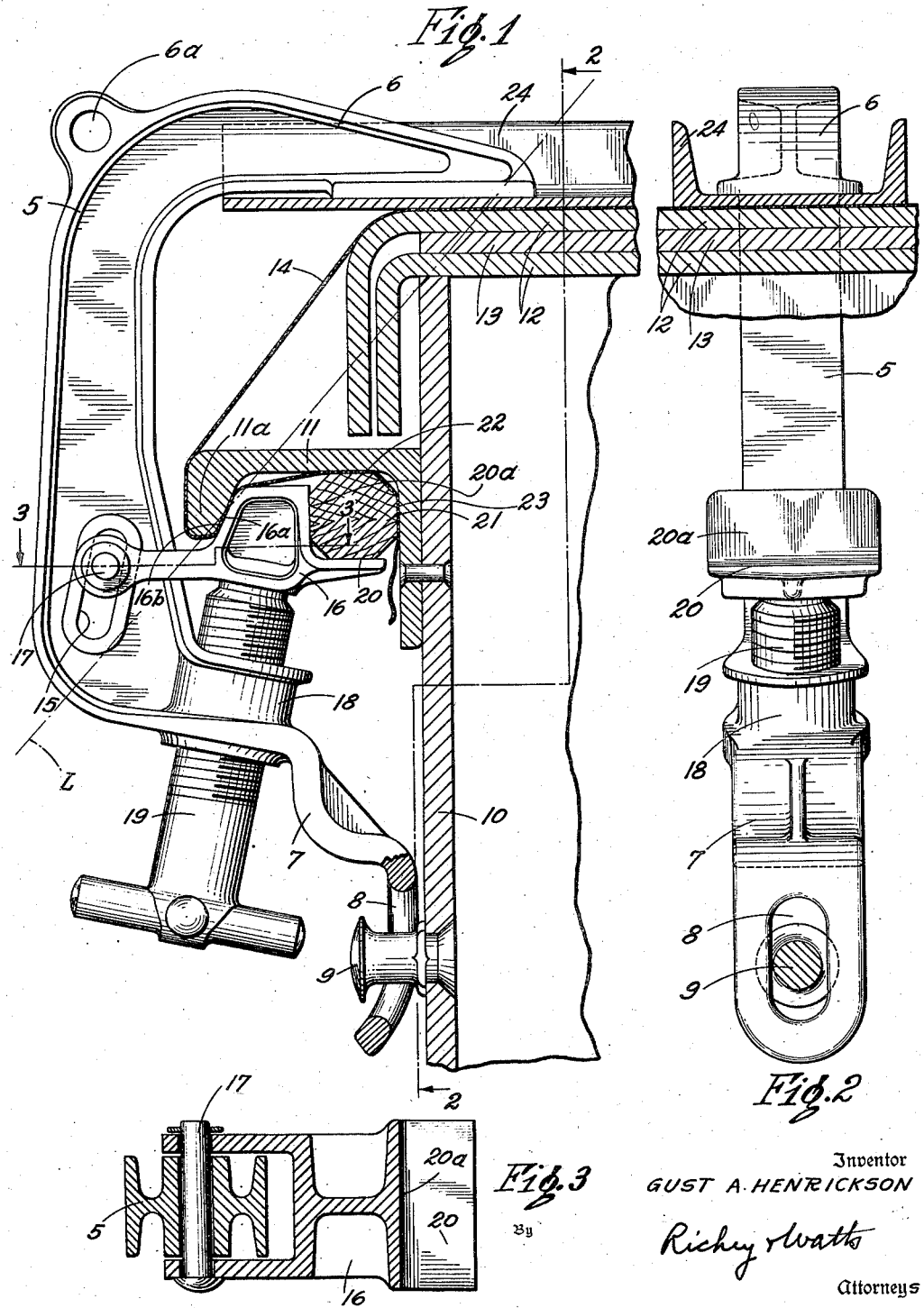

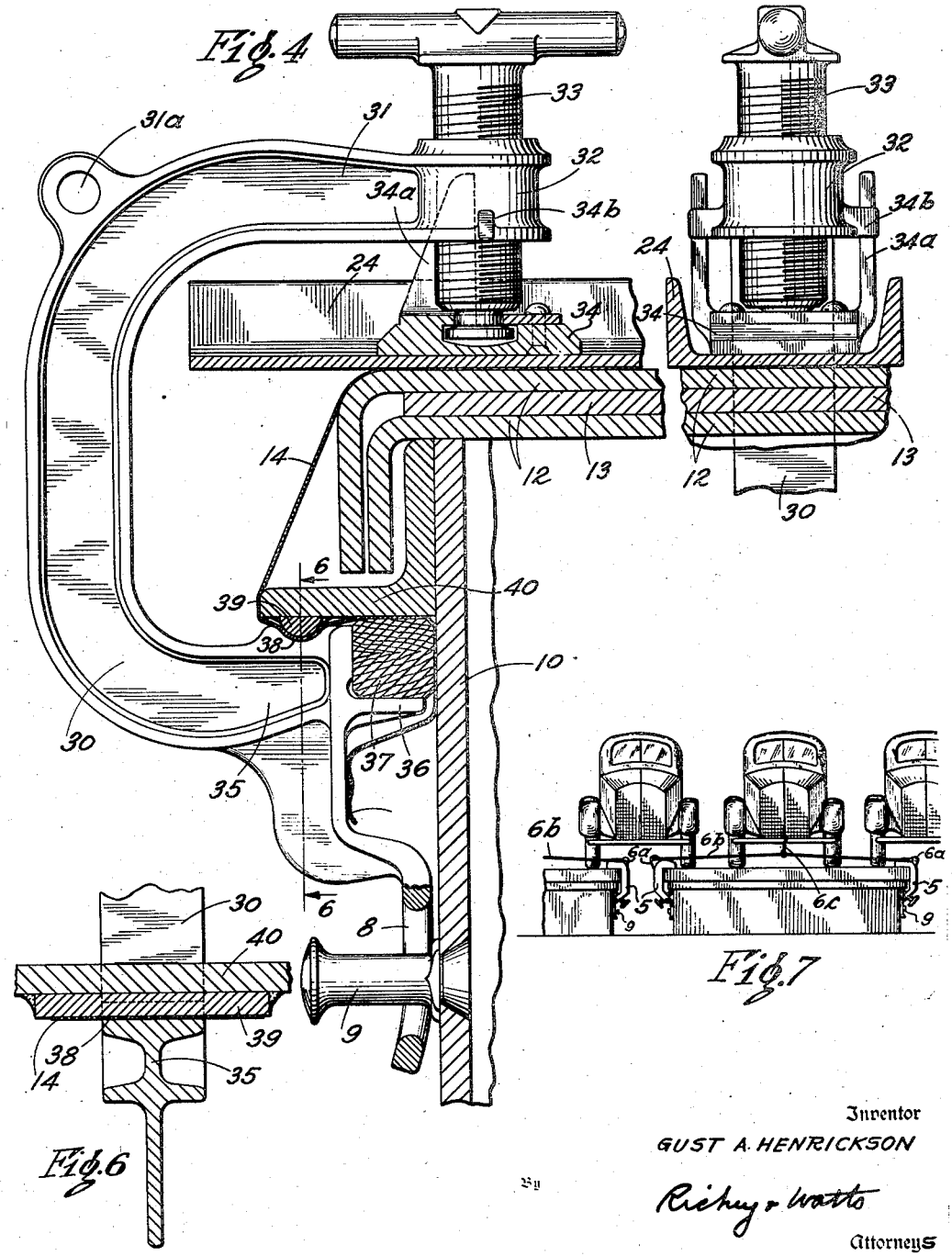

2,121,386

UNITED STATES PATENT OFFICE 2,121,386

HATCH FASTENER

Gust A. Henrickson, Cleveland, Ohio, assignor of one-half to Carl O. Rydholm, Cleveland, Ohio Application February 29, 1936, Serial No. 66,493

8 Claims. (Cl. 114—203)

This invention relates to hatch covering devices and more particularly to a hatch fastener arranged to secure hatch covers in place.

It is among the objects of my invention to provide a simple, strong and compact hatch fastener which will simultaneously clamp the hatch cover in position and secure a water-proof covering about the top and edges of the hatch cover to prevent water from entering the hatch from the underside of the hatch cover. A further object of my invention is to provide a hatch fastener in which an upper jaw is arranged to overhang a hatch cover and a lower jaw is arranged to be secured exteriorly of the hatch coaming and in which said lower jaw is provided with means to compensate for the eccentric relation between the jaws. A further object of my invention is to provide a hatch fastener having upper and lower jaws out of vertical alignment with each other in their clamping action and wherein the lower jaw is provided with means to compensate for laterally acting forces due to said jaws being out of vertical clamping alignment. It is a further object of my invention to provide a hatch fastener according to the preceding objects which may be pivotally retained on the coaming and thereby swung to an out-of-the-way position during the time the hatch is uncovered. Further objects and advantages will become apparent from the following description and the accompanying drawings in which:

Figure 1 illustrates a preferred embodiment of a hatch cover constructed according to my invention;

Figure 2 is an elevation of the hatch fastener taken at right angles to the view of Figure 1 along the line 2—2;

Figure 3 is a sectional view taken along the line 3—3 of Figure 1;

Figure 4 is an elevation of a modified form of hatch fastener constructed according to my invention;

Figure 5 is a view of the modification of Figure 4 taken at right angles thereto corresponding to the showing of Figure 2;

Figure 6 is a partial sectional view taken along the line 6—6 of Figure 4.

Figure 7 is an elevation partly in section of a plurality of hatch covers and cover clamps as assembled to secure automobiles to the hatch cover.

In the conventional form of flat deck hatch it is usual to provide a sectional metallic cover comprising generally flat sheets having down-turned edge flanges along two opposite sides. A popular type of sectional hatch cover comprises sections of the type referred to which are so proportioned with respect to each other that they may be telescoped one within the other for storage or stacking while the hatch is opened and the cargo being loaded through the open hatch. To cover the hatch the sheets are moved longitudinally of the hatch opening and are so proportioned that there is a substantial overlapping of adjacent sheets. When the hatch is closed it is necessary to provide a fastener to clamp the cover sections in their overlapping relationship and secure them against shift incident to the ship's movement. In some instances where it is important that the cargo be protected against water a tarpaulin or the like is stretched over the assembly of overlapped sheets and about the edges of the metallic covers where they overhang the coaming. It is extremely desirable that a simple and efficient hatch fastener be provided which will secure the hatch cover against any shifting movement and which will stretch and seal the tarpaulin about the edges of the hatch covers as the hatch fastener is clamped into position. Hatch fasteners heretofore provided have been found to be objectionable due to their complexity of construction and attendant high cost or their inability to perform both the cover clamping action and the tarpaulin tensioning or holding action. Certain types of hatch fasteners heretofore employed have occasioned the use of brackets projecting considerably from the hatch coaming wall and thus interfered with the movements of workmen about the edge of the hatch during loading and unloading.

To avoid the above objections and to attain the advantages generally outlined among the objects of my invention, my hatch fastener is preferably constructed as shown in Figure 1 wherein the body member 5 is provided with a top jaw 6 and a coaming engaging part 7. The portion 7 is apertured as at 8 and this aperture has considerable vertical extent and the entire fastener is freely slidable and rotatable by means of this aperture about the fastening pin 9. Preferably the pin 9 is riveted or otherwise secured to the coaming wall 10 and an outwardly projecting bracket 11 is arranged longitudinally adjacent the upper edge of the coaming. The overlapping top sections 12 may be spaced from each other in their overlapping portions by a batten 13 and the tarpaulin 14 stretched over the assembled sections and arranged beneath the underside of the bracket 11 as shown.

To render my hatch fastener adjustable so as to accommodate a variety of sizes, numbers and types of hatches and covers the body portion is provided with an inclined slot as at 15. The lower jaw 16 of the fastener is secured to the body by means of a pin 17 freely movable in the slot 15. The lower part of the body portion is provided with an internally threaded boss 18 which receives a clamping or adjusting screw 19. The inner end of the screw 19 bears against the underside of the pivoted jaw member 16 and as illustrated in Figure 1 the screw 19 is preferably inclined with respect to the vertical wall of the coaming 10 and with respect to the horizontal top jaw 6 to facilitate adjustment and direct the screw in the direction of the clamping action. The free end of the pivoted jaw adjacent the coaming is shaped to provide a notch or shelf as at 20 to support a longitudinally arranged wooden batten 21. The tarpaulin is wrapped about the batten and thus movement of the screw 19 which effects a movement of the batten toward the coaming will press the fabric of the tarpaulin snugly against the underside of the bracket 11 as at 22 and against the vertical wall of the bracket 11 as at 23.

A clamping channel 24 substantially U-shaped in cross section is arranged above the hatch covers and is proportioned to overhang the edges of the covers as best illustrated in Figure 1. The web portion of the channel 24 serves as a bearing plate for the top jaw 6 and prevents damage to the tarpaulin which might otherwise result from movement of the clamping jaw. The outer edge of the bracket 11 is preferably flanged as at 11a and the inner surface of the flange 11a is bevelled to provide an inclination as at 16b corresponding substantially to the inclination of the clamping screw 19. The portion of the pivoted jaw 16 is provided with an inclined surface as at 16a to co-operate with the inner wall of the flange 11a and the outer free end of the lower jaw as at 20 bears against the lower side of a polygonal wooden batten 21 and at 20a bears against a vertical face of said batten.

Since the top jaw of a clamping type hatch fastener must exert a downwardly acting force adjacent the vertical line of the coaming and since the lower jaw is of necessity attached exteriorly of the coaming the resultant clamping action is on a line extending diagonally between the upper and lower clamping jaws. I have indicated as at L in Figure 1 the general direction of the clamping action caused by the offset or eccentricity of the points of application of the clamping members. The resultant diagonal force as at L may be resolved into a useful vertical clamping force which acts downwardly in the line of the coaming to hold the cover thereagainst and an undesirable horizontally acting force which constantly tends to move the upper jaw laterally of the cover. In many of the prior art clamp type hatch fasteners the eccentricity of the clamping action or other characteristics of the attachment were such that the laterally acting force was frequently sufficient to move the clamp laterally from the cover or were inadvertently moved from the cover by the casual movements of the workmen or of the ship.

According to my invention means are provided to compensate or balance the above mentioned undesirable laterally acting force and, generally speaking, I achieve such compensating or balancing action in the preferred embodiment by providing the lower jaw 16 and the bracket flange 11a with co-operating inclined surfaces 16a—16b. By a proper selection of angularity in 16a on the lower jaw and 16b on the part 11a the clamping force exerted by the screw 19 may be translated into horizontal and vertical components whereby the horizontal component may equal or exceed the undesirable horizontal force resulting from clamp eccentricity. Referring to Figure 1 of the drawings it will be observed that each increment of vertical motion of the jaw 16a results in a slight horizontal movement of the entire hatch fastener toward the right. When the hatch cover and tarpaulin are securely clamped in place as shown the laterally acting or horizontal force across 16a is transmitted through the portion 20a and through the batten 21 to the tarpaulin at 23. A part of the vertically acting clamping force resulting from screw adjustment is transmitted through part 20 on jaw 16, thence through the batten 21 and to the horizontal portion of the bracket 11 as at 22. Thus the wooden batten and tarpaulin serve to cushion the entire clamping action and prevent the development of exceedingly high forces which might break the fastener.

The embodiment illustrated in Figure 4 is suited for hatch design where it is desired to have the clamping screws project from the top of the hatch. In this form of my invention the body of the fastener 30 is provided with an internally threaded boss 32 in the top jaw 31. A clamping screw 33 extends substantially vertically through the boss and is swiveled in a bearing washer 34 seated within the hatch cover channel 24. The bearing washer 34 is restricted in its rotary movement with the screw 33 by interengaging lugs 34a—34b on the washer and boss respectively.

The lower jaw 35 which in this form is rigid with the body 30 of the fastener is preferably shaped as in the preferred embodiment to provide a shelf or recess as at 36 to embrace the bottom and side walls of the wooden batten 37. Adjacent said recess or shelf as at 38 the upper edge of the jaw 35 is provided with a notch proportioned to receive a bracket lug 39. The bracket lug 39 is secured to the underside of the coaming bracket 40 and said lug and notch 38 co-operate to function somewhat as the inclined surfaces 16a—16b of the preferred embodiment. In this connection it will be observed that clamping action effected by turning down the screw 33 will pull the lower jaw upwardly and inwardly toward the coaming. The inner curved wall of the notch 38 is adapted to bear against the co-operating portion of the lug 39 and thus to balance or oppose the horizontal or laterally acting force which results from clamp eccentricity. In this form of my invention, as in the preferred embodiment, the entire fastener is pivotally and slidably secured to the coaming through the medium of coaming pin 9 and fastener slot 8. As will be understood by those skilled in the art this will permit the fastener to be lowered to an out-of-the way position during the loading of the hatch and yet will be in a convenient location when it is desired to fasten down the hatch cover. In this form of my invention as in the preferred embodiment the tarpaulin 14 is securely pressed against the bracket of the coaming wall at three spaced points by the action of the lower clamp jaw and the wooden batten which functions to cushion the clamping action.

From the foregoing it will be apparent that with the parts arranged according to my invention the horizontal force tending to unseat cause adverse slipping of the fastener will be compensated or over-balanced by a force tending to hold the clamp in position and that the tarpaulin and hatch cover are simultaneously tensioned and drawn into a snug water tight closed position.

The transportation of automotive vehicles upon the decks of ships has increased in volume within the last few years and this utilization of a ship's deck has given rise to a need for reliable apparatus to secure automobiles in place on the deck or hatch covers of a vessel. Accordingly, it is among the objects and advantages of my invention to provide a clamp which may be securely fixed in position to hold a hatch cover in place and simultaneously function to secure one or more automotive vehicles to the same hatch cover. As will be understood particularly by reference to Figure 7 the hatch cover holding function and the motor vehicle holding function operate jointly and each contributes to the utility of the other. Preferably the upper jaw 6 of the hatch fastener shown in Figure 1 is provided with an eye or opening as at 6a and the corresponding jaw 31 of the fastener of Figure 4 is provided with an aperture as at 31a. Ordinarily the hatches on automobile transport ships are spaced somewhat as shown in Figure 7; that is, so that one hatch cover may individually support a series of longitudinally aligned vehicles and a second series of similarly arranged vehicles will straddle the space between the hatches. By stretching a cable or chain intermediate a pair of hatch fasteners on opposite sides of the same cover a transverse automobile securing device is provided on the upper surface of the hatch cover. The cable or the like indicated as at 6b may be secured in the eyes 6a or 31a of co-operating hatch fasteners and a secondary securing cable 6c extends from the central portion of the fastening device 6b upwardly and is attached to the axle, bumper or similar transverse member of the motor vehicle. The fastening device 6c may be suitably provided with a turn buckle or the like and by adjustment thereof the motor vehicle is securely held through tension of members 6b and 6c to the hatch cover. The turnbuckle feature of the fastener 6c may be omitted and the function thereof obtained by temporarily depressing the tires of the vehicle while the member 6c is secured intermediate 6b and the axle or bumper of the vehicle. The tires may be depressed by two or three persons standing on the bumper of the vehicle during the attachment of the member 6c. That series of vehicles arranged to straddle the space between the hatches may be secured in position by a similar transverse cable or the like extending between adjoining hatch fasteners or between a pair of members such as 6c. From the foregoing it will be understood that the application of the transverse automotive securing device draws the hatch fasteners toward each other and thereby more securely holds the hatch cover in place.

Although I have described two embodiments of my invention in considerable detail I appreciate that certain variations of the invention may be effected by those skilled in the art without departing from the scope of the invention as defined in the following claims.

I claim:

1. In combination, a hatch having a coaming provided with an exteriorly arranged laterally extending bracket, means depending from the underside of said bracket to form a wedge shaped recess intermediate said means and said coaming, a hatch fastener provided with a jaw extending beneath said bracket, said jaw being recessed to receive a batten strip and being provided with a surface corresponding to and abutting the adjacent surface of said means whereby movement of said jaw into clamping position resiliently wedges said batten strip and jaw into said wedge shaped recess.

2. In combination, a hatch provided with coaming having a laterally extending bracket, a hatch cover arranged to overhang the edge of said coaming, a hatch fastener having a body portion and a rigid laterally extending top jaw arranged to overlie a portion of said cover, a movably mounted lower jaw secured to said fastener body extending laterally beneath said bracket, a depending flange formed on said bracket provided with an inclined surface, said lower jaw provided with a co-operating inclined surface and means to move said lower jaw with respect to said upper jaw along said co-operating inclined surfaces to secure said hatch cover in position.

3. In combination, a hatch having a coaming provided with a laterally extending bracket, a hatch cover arranged to overhang the upper edge of said coaming, a hatch fastener secured to said coaming comprising a body portion provided with a laterally extending rigid jaw proportioned to overhang said cover, a lower jaw pivotally and slidably secured to said fastener body provided with a batten receiving recess at its free end, an internally threaded bore formed in the lower portion of said fastener body provided with a clamping screw positioned to bear against said lower jaw, a flexible covering sheet arranged intermediate said upper jaw and said hatch cover, the edges of said sheet being positioned about said bracket, between said lower jaw and bracket and about a batten strip positioned in said batten receiving recess whereby movement of said clamping screw simultaneously draws said hatch cover into position and resiliently tensions said flexible sheet about said batten and the edge portions of said hatch cover.

4. In combination, a hatch having a coaming provided with a laterally extending bracket, a hatch cover arranged to overhang the upper edge of said coaming, a hatch fastener secured to said coaming comprising a body portion provided with a laterally extending rigid jaw proportioned to overhang said cover, a lower jaw pivotally and slidably secured to said fastener body provided with a batten receiving recess at its free end and being shaped to provide a cam surface intermediate said free end and its pivotal mounting, an internally threaded bore formed at the lower portion of said fastener body provided with a clamping screw positioned to bear against said lower jaw, a flexible covering sheet arranged intermediate said upper jaw and said hatch cover, the edges thereof being positioned about said bracket and between said lower jaw and bracket, a batten strip positioned in said batten receiving recess and engaging the edge portion of said flexible sheet whereby movement of said clamping screw effects an operative engagement through said covering sheet between a portion of said bracket and said lower jaw to urge the fastener laterally towards said coaming wall and resiliently clamp said cover and flexible sheet in position.

5. In combination, a hatch provided with a coaming having a laterally extending bracket, a fastener having a body portion provided with a laterally extending upper jaw adapted to overhang the upper edge of said coaming, a hatch cover arranged intermediate said hatch and said upper jaw, a rigid lower jaw on said fastener body extending laterally beneath said bracket, said lower jaw and the underside of said bracket provided with co-operating cam means to urge the fastener laterally toward said coaming and a batten receiving recess, a batten strip arranged in said recess and spacing said lower jaw with respect to said bracket and coaming wall, said upper jaw provided with a clamping screw arranged to operatively engage said hatch cover and thereby secure said cover in position.

6. A hatch fastener comprising a generally U-shaped clamp having an upper jaw arranged to overhang the hatch cover and a lower jaw of lesser lateral extent, a bracket mounted on the hatch coaming and co-operating means carried by said bracket and said lower jaw to compensate for the eccentricity in the clamp caused by unequal jaw extent, said hatch fastener provided with a lower portion having a slot therein, said lower portion being curved in a plane normal to said coaming, a headed securing means carried by the hatch coaming disposed in said slot whereby said hatch fastener through its curved, slotted portion may be tilted away from the coaming in said plane to facilitate arrangement of the hatch cover, the tarpaulin and associated parts.

7. A clamp adapted to secure a plurality of members between the jaws thereof comprising a body section, a laterally extending rigid jaw and a spaced laterally extending movable jaw, means to slidably and pivotally mount said movable jaw with respect to said clamp body, said movable jaw provided with a projecting cam inclined with respect to said movable jaw, a bracket carried by one of said secured members, said bracket provided with a projecting cam inclined with respect to said bracket and arranged to co-operate with said jaw carried cam, screw means carried by said clamp body arranged to bear against said movable jaw and move the same toward said first jaw through said co-operating bracket and jaw cams to effect a clamping of said members.

8. In combination, a hatch having coaming provided with a fastener bracket, a hatch cover, a hatch fastener provided with a laterally extending jaw overhanging a portion of the hatch cover, a lower fastener jaw extending laterally beneath said fastener bracket, said lower fastener jaw provided with a recess at the free end thereof arranged beneath said bracket to receive a batten strip, a portion of said lower jaw projecting upwardly adjacent said recess to engage the underside of said bracket, a tarpaulin arranged about said cover, bracket and batten, and means to move said lower jaw upwardly and inwardly with respect to said bracket to simultaneously clamp the cover to the coaming and tension said tarpaulin in said arranged position.

GUST A. HENRICKSON.